(12) United States Patent
Haar et al.

(10) Patent No.: US 6,325,713 B1
(45) Date of Patent: Dec. 4, 2001

(54) HARVESTING MACHINE WITH SIDE ACCESS OPENINGS AND COVER PANELS

(75) Inventors: Thomas B. Haar, Bettendorf, IA (US); Jay Harold Olson, Moline, IL (US)

(73) Assignee: Deere & Company, Moline, IL (US)

( * ) Notice: Subject to any disclaimer, the term of this patent is extended or adjusted under 35 U.S.C. 154(b) by 0 days.

(21) Appl. No.: 09/468,045

(22) Filed: Dec. 21, 1999

(51) Int. Cl.7 ............................... A01F 7/04; A01F 12/26
(52) U.S. Cl. ........................... 460/69; 460/108; 460/119
(58) Field of Search ........................... 460/119, 59, 66, 460/69, 79, 80, 107, 108, 109, 150; 52/630, 591.4, 591.5, 309.1; 428/174, 177, 179

(56) References Cited

U.S. PATENT DOCUMENTS

| 3,696,815 | 10/1972 | Rowland-Hill et al. |
| 3,847,160 | 11/1974 | De Coene et al. |
| 4,177,820 | * 12/1979 | Rowland-Hill ............... 460/69 |
| 4,249,543 | * 2/1981 | Rowland-Hill ............... 460/69 |
| 4,441,512 | * 4/1984 | Bushboom ................... 460/69 |
| 5,152,717 | * 10/1992 | Nelson et al. ............. 460/122 |
| 5,617,683 | * 4/1997 | Ney ............................. 52/202 |
| 5,829,209 | * 11/1998 | Keyl ............................ 52/192 |
| 5,951,395 | * 9/1999 | Peter ......................... 460/119 |
| 6,085,485 | * 7/2000 | Murdock ................. 52/783.19 |

* cited by examiner

Primary Examiner—Thomas B. Will
Assistant Examiner—Meredith Petravick

(57) ABSTRACT

A harvesting machine having a rotary crop processing unit supported between a pair of spaced side sheets with openings for access to the crop processing unit and a cleaning system therebelow. Molded plastic cover panels extend from the lower edge of the access openings on the side sheet to the crop processing unit to close the access openings. Multiple cover panels are used in each opening to minimize the size of each cover panel for ease in handling and the cover panels are retained by hand manipulated pins or fasteners to remove and install the panels without the use of tools.

19 Claims, 7 Drawing Sheets

HARVESTING MACHINE WITH SIDE ACCESS OPENINGS AND COVER PANELS

BACKGROUND OF THE INVENTION

1. Field of the Invention

The present invention relates to a harvesting machine having a rotary crop processing unit and in particular to a harvesting machine having access openings on the sides thereof and cover panels that extend from side sheets of the harvesting machine inward to the crop processing unit to close the access openings.

2. Description of the Related Art

Harvesting machines, such as combines, having a rotary crop processing unit located between a pair of upright, longitudinally extending side sheets are well known. Such harvesting machines may have openings in the side sheets that are closed with removable cover panels. When the cover panels are removed, access to the threshing and/or separating sections of the crop processing unit is provided for service and cleaning. Typically, the access openings are relatively small in size or, if larger, have large metal covers that are difficult to remove and reinstall. When access openings are provided, they are usually on the left side of the machine.

SUMMARY OF THE INVENTION

The harvesting machine of the present invention has side sheets on both sides with upper portions that are open between the structural members of the side sheets to provide access to the crop processing unit and cleaning system. Access is provided to the threshing concaves and the separating grates as well as to the crop engaging members on the rotor when the concaves and grates are removed. With openings on both side sheets, servicability and cleanability of the crop processing unit and cleaning system is greatly improved as compared with prior harvesting machines.

The access openings are closed by cover panels that extend from the side sheets inwardly to the axially extending side rails of the crop processing unit, above the concaves and grates. Multiple cover panels are used on each side to reduce the size of each individual cover panel. Preferably, all the cover panels on the left side of the harvesting machine are identical to one another while all the cover panels on the right side of the harvesting machine are identical to one another. The cover panels are arranged to overlap one another at the front and rear edges of the cover panels. The overlap enables the cover panels to compensate for manufacturing variations in the size of the access openings by varying the extent of the overlap. Preferably the cover panels are a double wall, plastic molded component to provide durable cover panels that are lightweight and easily manipulated.

The cover panels are held in place by tucking the upper edge of the cover panel under a lip on the crop processing unit and pressing the bottom edge of the cover panel inward to insert tabs projecting from the side sheet into slots along the bottom edge of the cover panels. A quick-lock pin or other type of fastener is inserted through an aperture in the projecting tab to retain the cover panels in place. At the front and rear sides of the access openings, the cover panels are provided with gaskets to seal against the machine structure to close the openings.

DESCRIPTION OF THE PREFERRED EMBODIMENT

Figure 1:
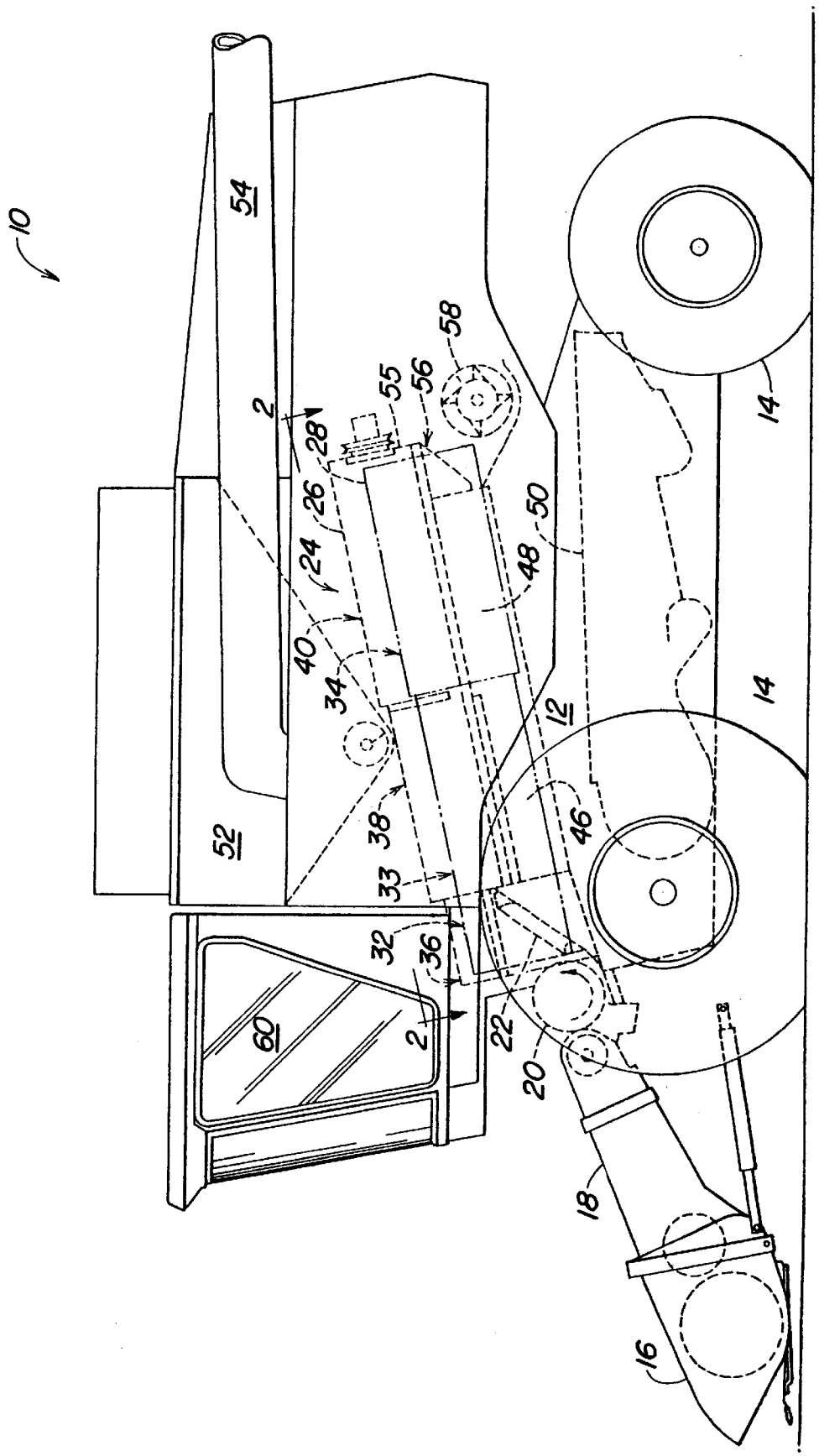
FIG. 1 is a side view of a harvesting machine having a rotary crop processing unit and the cover panels according to the present invention.

FIG. 1 shows an agricultural combine 10 includes a support structure 12 and ground engaging means 14, shown in the form of tires. Alternatively, tracks can be used in place of some or all of the tires. A harvesting platform 16 harvests a crop and directs it to a feeder house 18. The harvested crop is directed by the feeder house to a beater 20. The beater directs the crop upwardly to a rotary crop processing unit 24. The rotary crop processing unit is located between left and right side sheet 64, 66, respectively, shown in FIGS. 2 and 3. The side sheets form part of the support structure 12.

The rotary crop processing unit 24 comprises a rotor housing 26 and a rotor 28 located in the rotor housing. The harvested crop enters the rotor housing through an inlet 22 of the rotor housing 26. The rotor is provided with an infeed portion 32, a threshing portion 33, and a separating portion 34. The rotor housing has a corresponding infeed section 36, a threshing section 38 and a separating section 40.

Figure 4:
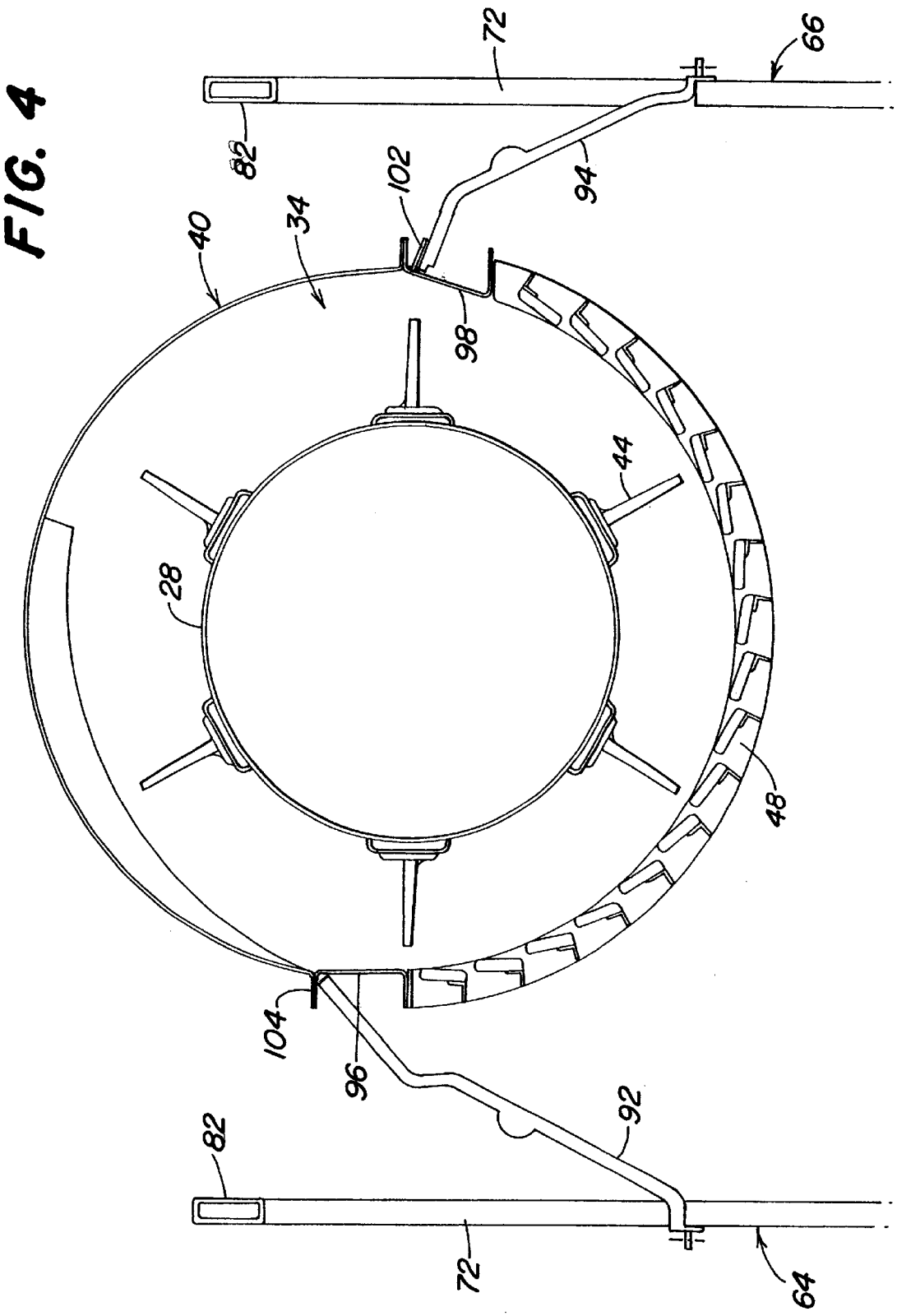
FIG. 4 is a sectional view of the harvesting machine as seen from substantially the line 4—4 of FIG. 3.

Both the threshing portion 33 and the separating portion 34 of the rotor are provided with crop engaging members, of which only the crop engaging members 44 of the separating portion of the rotor are shown in FIG. 4. The threshing section 38 of the housing has a concave 46 along the lower portion thereof formed of multiple concave elements. Likewise, the separating section 40 of the housing has a grate 48 formed of multiple grate elements. Grain and chaff released from the crop mat falls through openings in the concave 46 and grate 48 to a combine cleaning system 50 below the rotary crop processing unit 24. The concave and grate prevent the passage of crop material larger than grain or chaff from entering the combine cleaning system 50.

The cleaning system 50 removes the chaff from the grain. The clean grain is then directed by an elevator (not shown) to a clean grain tank 52 where it can be directed to a truck or grain cart by unloading auger 54. Straw that reaches the end 55 of the rotor housing 26 is expelled through an outlet 56 to a beater 58. The beater 58 further propels the straw out the rear of the combine. The operation of the combine is controlled from the operator's cab 60.

Figure 2:
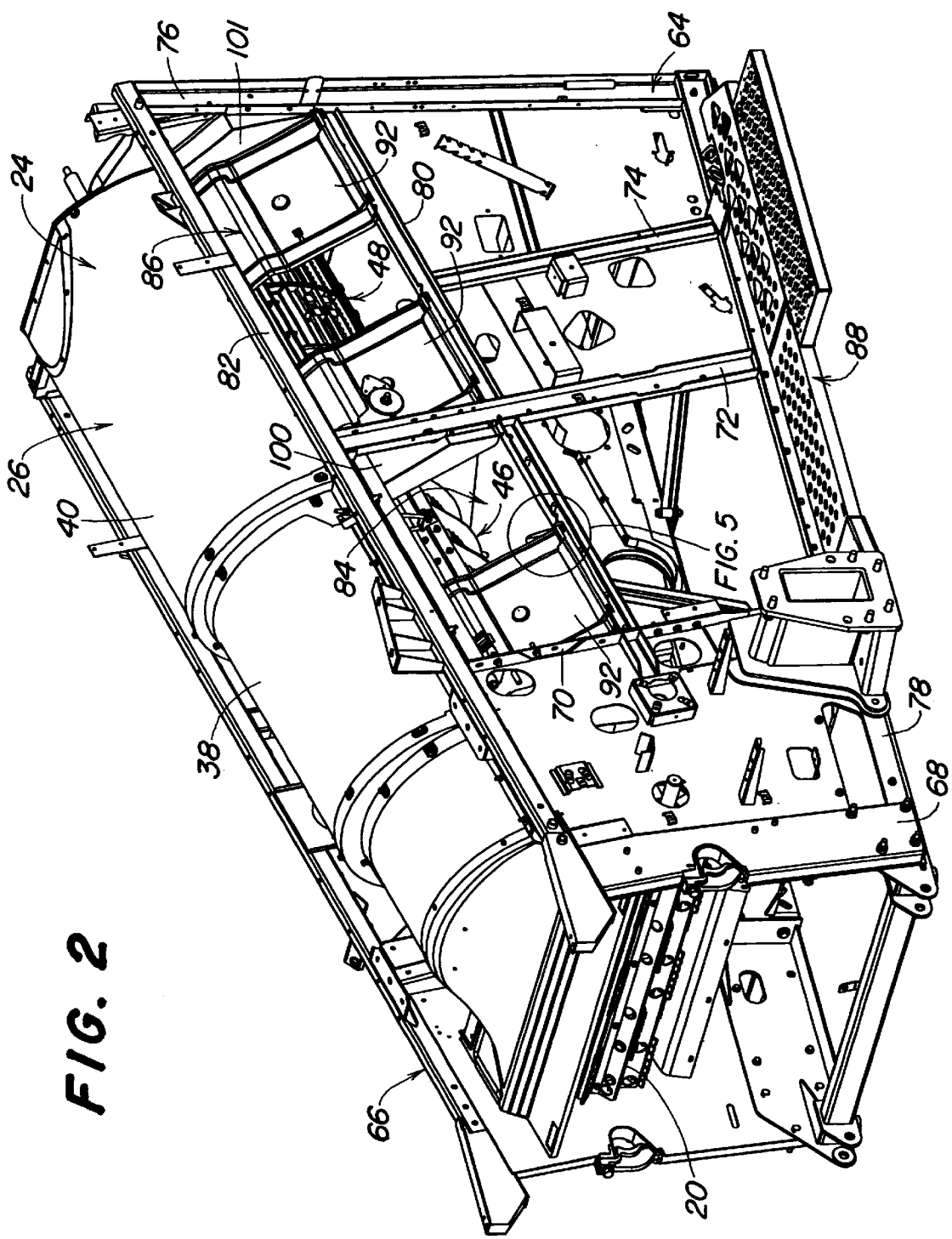
FIG. 2 is a perspective view of the side sheets and rotary crop processing unit of the harvesting machine of the present invention.
Figure 3:
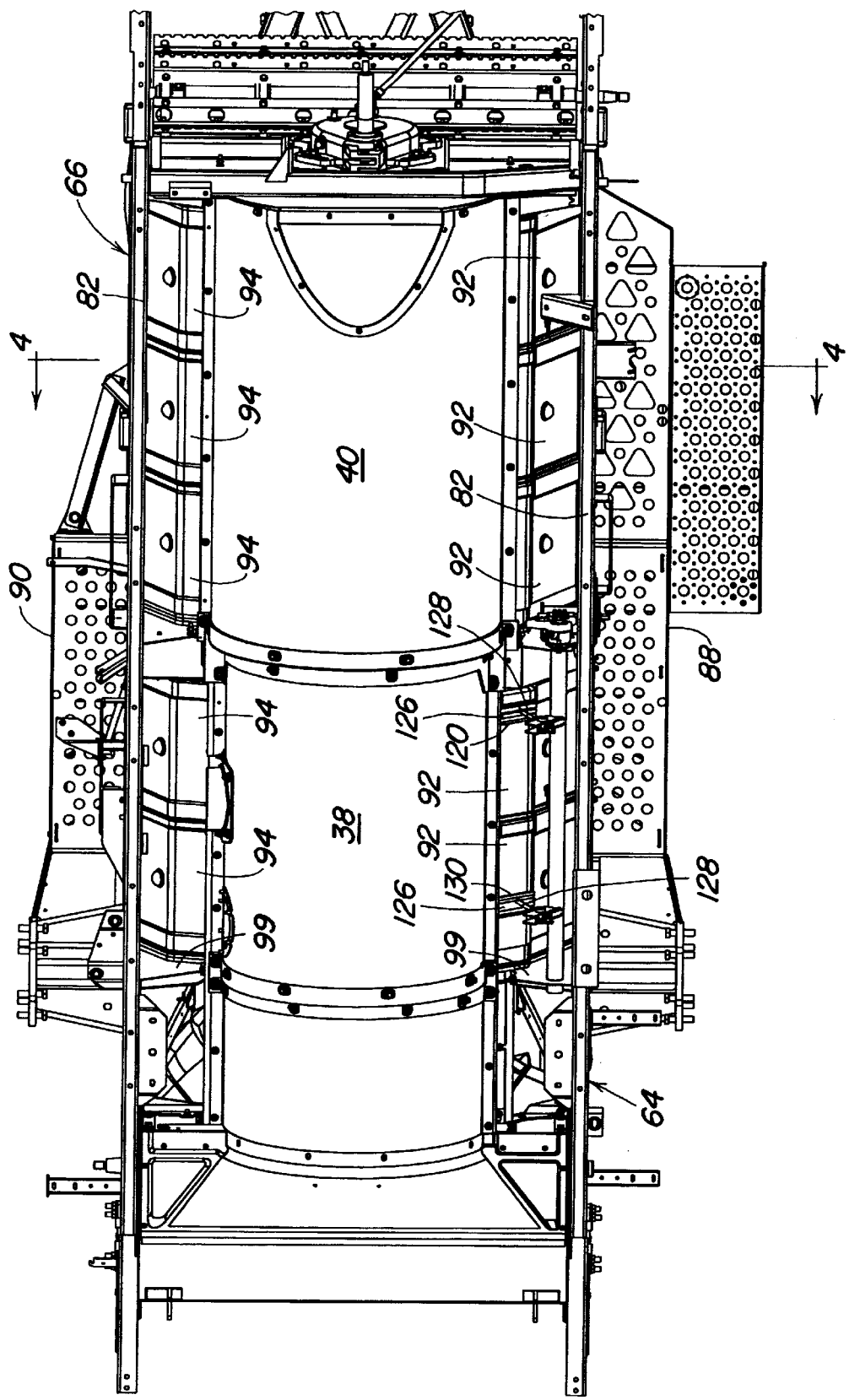
FIG. 3 is a top view of the portion of the harvesting machine shown in FIG. 2.

With reference to FIG. 2, the left side sheet 64 is shown in greater detail. The right side sheet 66 is similar in structure to the left side sheet 64. The side sheets have a plurality of spaced upright frame members 68, 70, 72, 74, 76 and spaced longitudinal frame members 78, 80 and 82. The longitudinal frame members 80 and 82 are inclined rearwardly and upwardly, generally parallel to the crop processing unit 24. The left and right side sheets are open between the longitudinal frame members 80, 82 and between the upright frame members 70, 72, 76 forming a pair of access openings 84 and 86 on each side of the combine. The front opening 84 is generally adjacent the threshing section 38 of the rotor housing while the rear opening 86 is generally adjacent the separating section 40 of the rotor housing. The concave 46 and the grate 48 are accessible through the access openings 84 and 86. With the concaves and/or the grates removed, the crop engaging members on the rotor can also be accessed. Left and right service platforms 88 and 90 (FIG. 3) are provided to stand upon while servicing the combine through the side access openings 84, 86.

During operation of a combine, the access openings 84, 86 are closed by multiple left and right cover panels 92, 94 respectively. In FIG. 2, one of the cover panels 92 has been removed from each opening. The cover panels are attached at their lower edges to the longitudinal frame member 80 of each side sheet and extend inwardly and upwardly to the left and right side rails 96 and 98 of the rotor housing 26, respectively, as shown in FIG. 4. Two cover panels close each front access opening 84 while three cover panels close each rear access opening 82. A front bulkhead 99 (FIG. 3) is provided at the upright frame member 70, an intermediate bulkhead 100 (FIG. 2) is provided at the upright frame member 72 (FIG. 2) and a rear bulkhead 101 is provided at the upright frame member 76. The bulkheads all extend inward to the rotor housing to couple the housing to the side sheets.

Figure 5:
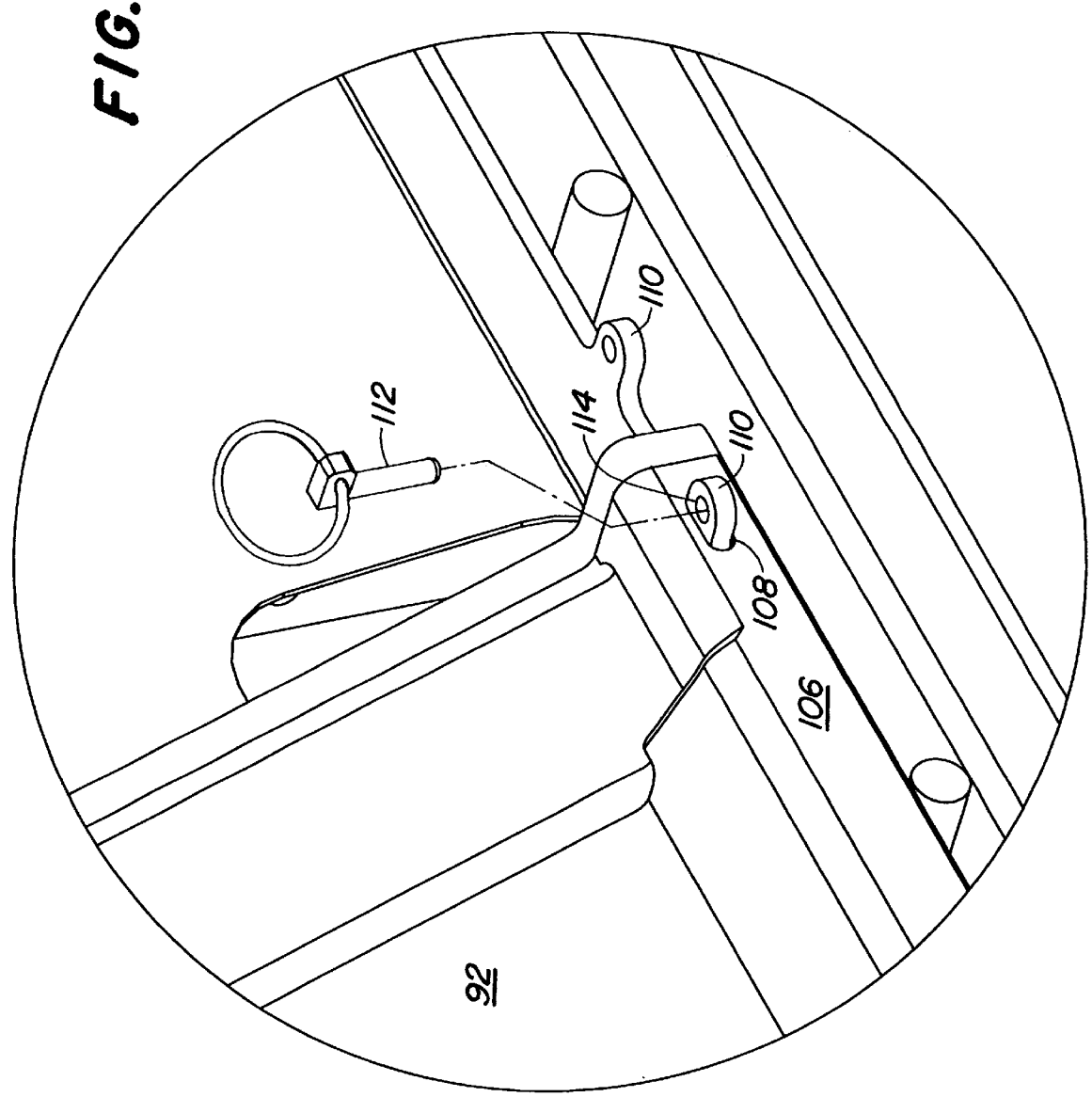
FIG. 5 is a perspective view of the circled portion labeled 5 in FIG. 2.

With reference to FIG. 4, the mounting of the cover panels 92, 94 is shown in greater detail. The upper edges of the right cover panels 94 are tucked under a flange 102 welded to the right side rail 98 of the separating section 40 of the rotor housing. The left cover panels 92 are tucked under the upper flange 104 of the left side rail 96 of the rotor housing. Preferably, the upper flange of the housing side rail is used to secure the cover panel to avoid the need for a separate flange such as the flange 102 on the right side. The lower edges 106 of the cover panels have spaced slots 108 that receive tabs 110 projecting from the longitudinal frame members 80 of the side sheets (FIG. 5). The cover panels are to fit snugly in the access openings and to be pressed over the tabs 110. This causes the upper edges of the cover panels to be firmly pressed under the flange 102 or rail upper flange 104 as described above. Quick-lock pins 112, or other fasteners, are placed through apertures 114 in the tabs to hold the lower ends of the cover panels in place. The quick-lock pins can be removed by hand manipulation so that the cover panels can be removed and installed without the use of tools.

Figure 6:
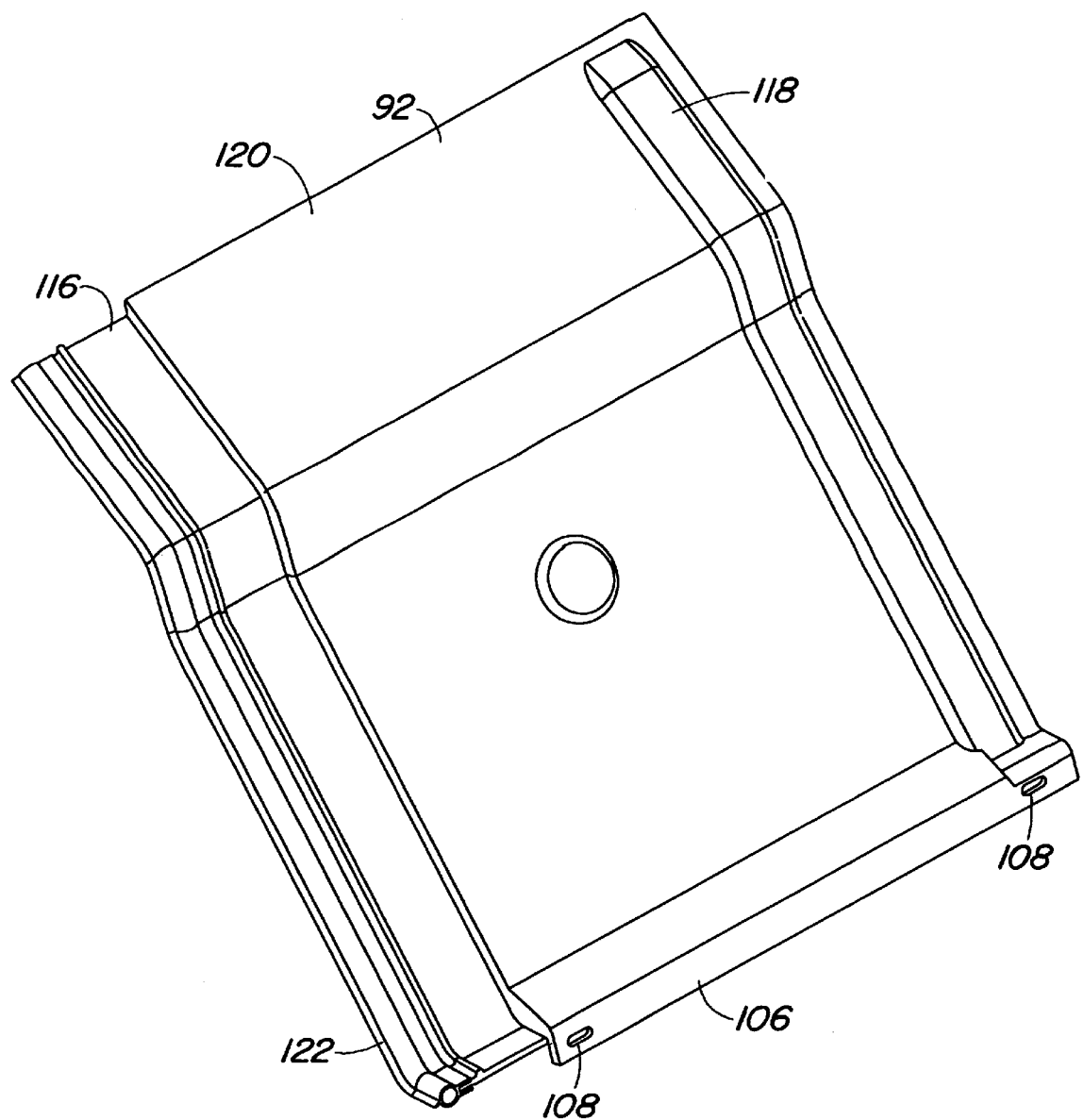
FIG. 6 is a perspective view of the outer side of a left cover panel according to the present invention.
Figure 7:
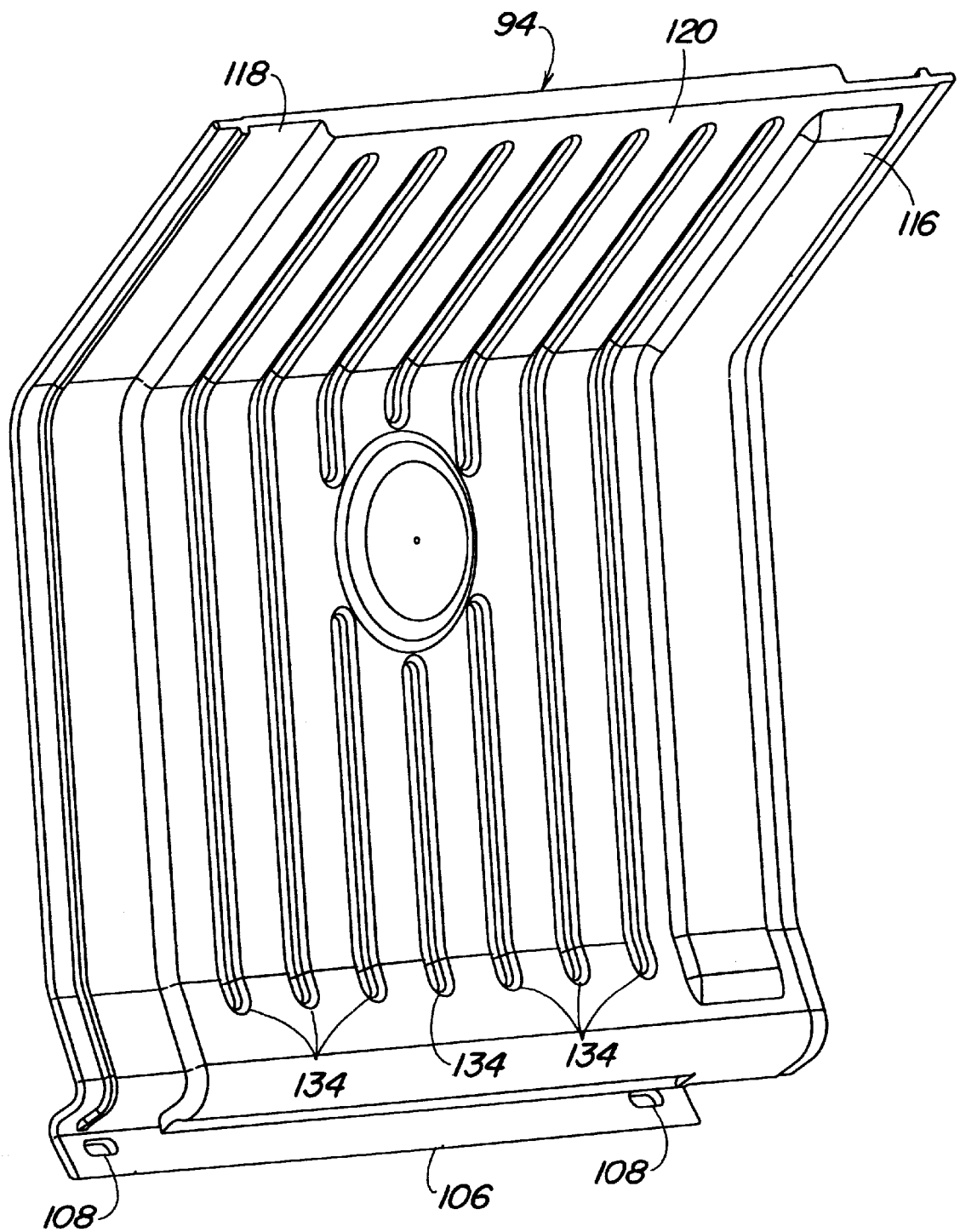
FIG. 7 is a perspective view of the inner side of a right cover panel according to the present invention.

With reference to FIGS. 6 and 7, the cover panels 92, 94 are shown in greater detail. The cover panels have a front edge portion 116 that is recessed inward from the center main body portion 120 of the cover panel and a rear edge portion 118 that projects outward from the center main body portion 120. The cover panels are installed in the access openings by installing the rearmost cover panel first and then the next adjacent cover panel is placed with the rear edge portion 118 overlapping the recessed front edge portion 116 of the adjacent, rearward cover panel to provide an overlapping fit and to ensure that the opening is fully closed. The front edge of the cover panel shown in FIG. 6 carries a flexible gasket 122 for sealing engagement with the bulkhead at the front of the access opening in which it is placed. The rearmost cover panel in each access opening carries a similar gasket along the rear edge of the cover panel for sealing engagement with a bulkhead. The gaskets are added to the edges of the molded cover panels.

In a preferred embodiment, the cover panels 92 on the left side of the harvesting machine are identical with one another so that only a single part needs to be manufactured for use at all locations on the left side. Likewise, the right cover panels 94 are identical to one another. The two left cover panels 92 at the threshing section 38 of the housing have slots 126 for passage of a concave clearance adjustment rod 128 through the cover panels. Gaskets 130 are placed on each side of the slots to seal the slots around the adjustment rods. A slot template is formed on the inner surface of the cover panels so that the slots can be cut into a replacement cover panel if the cover panel is intended for the front access opening 84. The template for the slots allows a single service part to be used for all the cover panels of the left side.

The cover panels are preferably blow molded plastic to provide a lightweight, yet durable, cover panel that is easy to manipulate. A preferred material for the cover panel is high density polyethylene. The cover panels are preferably of a double wall construction. The inner wall, as shown in FIG. 7 has a plurality of ribs 134 to add strength to the cover panel.

While the invention has been shown with a harvesting machine have a single rotor, it will be appreciated that the invention can be employed in a combine or other harvesting machine having twin rotors in a rotary separator that follow a transverse threshing cylinder.

The harvesting machine of the present invention provides large openings to access the crop processing unit and cleaning system with small cover panels to close the openings during operation. The cover panels are relatively small, light weight and easy to install and remove by hand. Service and cleaning of the machine is facilitated by the openings and cover panels.

The invention should not be limited to the above-described embodiment, but should be limited solely by the claims that follow.

What is claimed is:

1. A harvesting machine comprising:
    a pair of side sheets;
    an elongated crop processing unit extending in a fore and aft axial direction between the side sheets and being mounted thereto, the crop processing unit including a housing with a rotor therein to process crop material passing between the housing and the rotor, a lower portion of the housing having openings therein for grain to pass through out of the housing;
    a cleaning system between the side sheets and below the housing for receiving and cleaning grain falling from the housing;
    one side sheet having an opening therein above the cleaning system to provide access to the housing; and
    at least one cover panel removable mounted to and extending from a lower edge of the opening in the side sheet to the housing at a location above the openings in the lower portion of the housing to close the opening.

2. The harvesting machine as defined by claim 1 wherein the at least one cover panel is removably mounted with hand manipulated fasteners whereby the cover panel is removable without the use of tools.

3. The harvesting machine as defined by claim 1 comprising multiple cover panels to close the opening in the side sheet.

4. The harvesting machine as defined by claim 3 wherein the multiple cover panels on the side sheet are identical to one another.

5. The harvesting machine as defined by claim 3 wherein the multiple cover panels are positioned axially adjacent one another and overlap one another at joints between adjacent cover panels.

6. The harvesting machine as defined by claim 1 wherein the cover panel is molded of plastic.

7. The harvesting machine as defined by claim 6 wherein the cover panel has a double wall construction.

8. The harvesting machine as defined by claim 1 wherein both side sheet fame members have at least one said opening therein and at least one said cover panel is provided to close each opening.

9. The harvesting machine as defined by claim 8 wherein multiple cover panels are provided on each side of the harvesting machine with all the cover panels on one side of the harvesting machine being identical to the other cover panels on the one side of the harvesting machine.

10. The harvesting machine as defined by claim 1 wherein the crop processing unit has a threshing section and a separating section and the side sheets have one opening along the threshing section and another opening along the separating section and further comprising multiple cover panels for each opening in each side sheet.

11. A harvesting machine comprising:

a pair of side sheets;

an elongated crop processing unit extending in a fore and aft axial direction between the side sheets and being mounted thereto, the crop processing unit including a housing with a rotor therein to process crop material passing between the housing and the rotor, a lower portion of the housing having openings therein for grain to pass through out of the housing;

a cleaning system between the side sheets and below the housing for receiving and cleaning grain falling from the housing;

one side sheet having an opening therein above the cleaning system to provide access to the lower portion of the housing; and multiple cover panels removably mounted in the opening to close the opening to prevent access to the lower portion of the housing and the cleaning system, the multiple panels extending from a lower edge of the opening in the side sheet to the housing at a location above the openings in the lower portion of the housing.

12. The harvesting machine as defined by claim 11 further comprising one said opening in both side sheets and multiple cover panels in each opening.

13. The harvesting machine as defined by claim 12 further comprising two of the openings in each of the side sheets and multiple cover panels in each of the openings.

14. The harvesting machine as defined by claim 13 wherein the cover panels in the openings in one side sheet are identical.

15. The harvesting machine as defined by claim 11 wherein the multiple cover panels are positioned axially adjacent one another and overlap one another at joints between adjacent cover panels.

16. The harvesting machine as defined by claim 11 wherein the multiple cover panels are removably mounted with hand manipulated fasteners whereby the cover panels are removable without the use of tools.

17. The harvesting machine as defined by claim 11 wherein the cover panels are molded of plastic.

18. The harvesting machine as defined by claim 17 wherein the cover panels have a double wall construction.

19. A harvesting machine comprising:

a pair of side sheets;

an elongated crop processing unit extending in a fore and aft axial direction between the side sheets and mounted thereto, the crop processing unit including a rotor housing with a rotor therein to process crop material passing between the housing and the rotor, the housing having threshing section and a separating section rearward of the threshing section;

the housing being mounted to the side sheets through a front bulkhead at a forward end of the threshing section, an intermediate bulkhead between the threshing and separating sections and a rear bulkhead rearward of the separating section;

a cleaning system between the side sheets and below the housing for receiving and cleaning grain falling from the housing;

the side sheets having an access opening to the threshing section of the housing extending between the front and intermediate bulkheads and an access opening to the separating section extending between the intermediate and rear bulkheads; and multiple cover panels removably mounted in the access openings to close the openings and prevent access to the crop processing unit therethrough, the multiple cover panels extending from a lower edge of the opening in the side sheet to the housing at a location above the openings in the lower portion of the housing.

* * * * *